US007797284B1

(12) United States Patent
Chellappa et al.

(10) Patent No.: US 7,797,284 B1
(45) Date of Patent: Sep. 14, 2010

(54) DEDICATED SOFTWARE THREAD FOR COMMUNICATING BACKUP HISTORY DURING BACKUP OPERATIONS

(75) Inventors: Sridhar Chellappa, Mars, PA (US); Balaji Ramani, Cranberry Township, PA (US); Umesh Rajasekaran, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 367 days.

(21) Appl. No.: 11/844,442

(22) Filed: Aug. 24, 2007

Related U.S. Application Data

(60) Provisional application No. 60/913,957, filed on Apr. 25, 2007.

(51) Int. Cl.
*G06F 17/30* (2006.01)
(52) U.S. Cl. ............. 707/668; 707/695; 711/162; 709/213; 718/107
(58) Field of Classification Search .......... 707/999.203, 707/999.204, 695, 668; 711/162; 709/213–216; 718/107
See application file for complete search history.

(56) References Cited

U.S. PATENT DOCUMENTS 6,671,773 B2 12/2003 Kazar et al.
6,718,332 B1 * 4/2004 Sitaraman et al. ........... 707/102
2005/0138195 A1 * 6/2005 Bono ........................ 709/231

OTHER PUBLICATIONS

U.S. Appl. No. 60/913,957, entitled Dedicated Software Thread For Communicating Backup History During Backup Operations, by Chellappa et al., on Apr. 25, 2007, 37 pages.
U.S. Appl. No. 11/118,466 entitled System and Method for Multiplexing Channels Over Multiple Connections in a Storage System Cluster, by Corbett et al., Apr. 29, 2005, 39 pages.
U.S. Appl. No. 10/796,249 entitled System and Method for Indexing a Backup Using Persistent Consistency Point Images, by Owara et al., on Mar. 9, 2004, 63 pages.
Stager, et al., "Network Data Management Protocol—Version 3 (ftp://ftp.ndmp.org/pub/version.3/doc/ndmp_draft_v3_0.pdf)", NDMP, Network Working Group, Internet Draft, Sep. 1997, 84 pages.
* cited by examiner

*Primary Examiner*—Leslie Wong
*Assistant Examiner*—Amanda Willis
(74) *Attorney, Agent, or Firm*—Cesari and McKenna, LLP

(57) ABSTRACT

A technique provides a dedicated software thread for communicating backup history to clients of a storage system during backup operations. Illustratively, an operating system of the storage system may execute one or more "session" (e.g., backup) threads and a "worker" (e.g., backup history) thread. In particular, the one or more session threads are each configured to backup stored data for a corresponding client to a backup storage device and to generate backup history of data backed up to the backup storage device. Also, the worker thread is configured to obtain the backup history from the one or more session threads, and transmit the backup history to the corresponding client of each of the one or more session threads. In this manner, the worker thread may wait for a response from the corresponding clients, while the one or more corresponding session threads continue to backup the stored data and generate backup history.

20 Claims, 6 Drawing Sheets

DEDICATED SOFTWARE THREAD FOR COMMUNICATING BACKUP HISTORY DURING BACKUP OPERATIONS

CROSS-REFERENCE TO RELATED APPLICATION

The present application claims the benefit of U.S. Provisional Patent Application Ser. No. 60/913,957, which was filed on Apr. 25, 2007, by Sridhar Chellappa et al. for a DEDICATED SOFTWARE THREAD FOR COMMUNICATING BACKUP HISTORY DURING BACKUP OPERATIONS, which is hereby incorporated by reference.

FIELD OF THE INVENTION

The present invention is directed to storage systems and, in particular, to communicating backup (file) history with clients during backup operations of the storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN), and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

The use of magnetic tape or other backup storage device to store a sequential backup of a data (files, directories, etc.) from a storage system has been popular for many decades, such as where a client requests that the storage system back up the client's data. According to a typical tape backup, data is stored on tape media in association with a "backup index" that points to the location on the tape or another image structure where the particular directory, file, etc. resides. The index allows the client/user to ascertain the nature of the data stored and to retrieve it when needed for restoration to the storage system (for, example to an active in-core or on-disk file structure). The index traditionally takes the form of a table of contents of the various files and directories stored as backups serially on the tape or other media.

In particular, backup applications (threads) of the storage system generate a catalog of data/files that is backed up to a backup storage device (e.g., a tape device) as the data is backed up. This catalog, or "backup history" (or "file history") for each set of data backed up (e.g., a certain amount of data or certain file/files, etc.) is transmitted to is the client requesting the backup, which may use the backup history to create the backup index mentioned above. Upon receipt of the backup history, the client may acknowledge receipt of the backup history to the backup application, accordingly. Notably, the backup operation, backup history generation, and the posting (transmission) of the backup history to the client generally occur in lockstep; that is, one step occurs at a time. In other words, the backup thread backs up the data, generates backup history for the data, and sends the backup history to the client.

One problem associated with this lockstep operation, however, is that the backup thread typically waits for a response from the client that acknowledges the backup history prior to backing up a next set of data. Accordingly, any transmission delays and client processing delays for which the backup thread waits is idle time of the backup thread. Thus, the transmission of (and subsequent waiting for a response to) backup history is a significant performance bottleneck. In addition, in the event multiple backup threads are operating on a storage system, e.g., for multiple backup applications/threads occurring in parallel, the delays associated with transmitting backup history may be substantially increased. Specifically, locks may be taken out by the backup threads that prevent other backup threads from operating, i.e., making other backup threads wait while one backup thread waits for a response from its client. There remains a need, therefore, for an efficient technique to perform backup operations, e.g., for a plurality of backup threads, and to communicate backup history to clients during the backup operations.

SUMMARY OF THE INVENTION

The present invention overcomes the disadvantages of the prior art by providing a dedicated software thread for communicating backup history to clients of a storage system during backup operations. Illustratively, an operating system of the storage system comprises one or more "session" (e.g., backup) threads and a "worker" (e.g., backup history) thread. In particular, the one or more session threads are each configured to backup stored data for a corresponding client to a backup storage device (e.g., a tape device) and to generate backup history (e.g., file history) of data backed up to the backup storage device. Also, the worker thread is configured to obtain the backup history from the one or more session threads, and transmit the backup history to the corresponding client of each of the one or more session threads. In this manner, the worker thread may wait for a response from the corresponding clients, while the one or more corresponding session threads continue to backup the stored data and generate backup history. If a negative response (e.g., no response) is received, then the worker thread informs a corresponding session thread, which may cease the backup operation accordingly.

Advantageously, the novel technique provides a dedicated software thread for communicating backup history to clients of a storage system during backup operations. By configuring a worker thread to handle backup history communication with the clients, the novel technique allows the session threads to not have to wait for the client responses, and may thus continue to perform the backup of the stored data. In particular, the session threads are not blocked by the delays associated with client communication, thus improving efficiency of the backup operation. Also, by maintaining multiple session threads separately at the worker thread, the multiple session threads may operate in parallel, e.g., without requiring the acquisition and/or management of locks.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF ILLUSTRATIVE EMBODIMENTS

One or more embodiments of the present invention provide a dedicated software thread for communicating backup history to clients of a storage system during backup operations. By configuring a worker thread to handle backup history communication with the clients, the novel technique allows session threads to perform the backup of the stored data and to not have to wait for the client responses. In particular, the session threads are not blocked by the delays associated with client communication, thus improving efficiency of the backup operation. Also, by maintaining multiple session threads separately at the worker thread, the multiple session threads may operate in parallel, e.g., without requiring the acquisition and/or management of locks.

A. Cluster Environment

Figure 1:
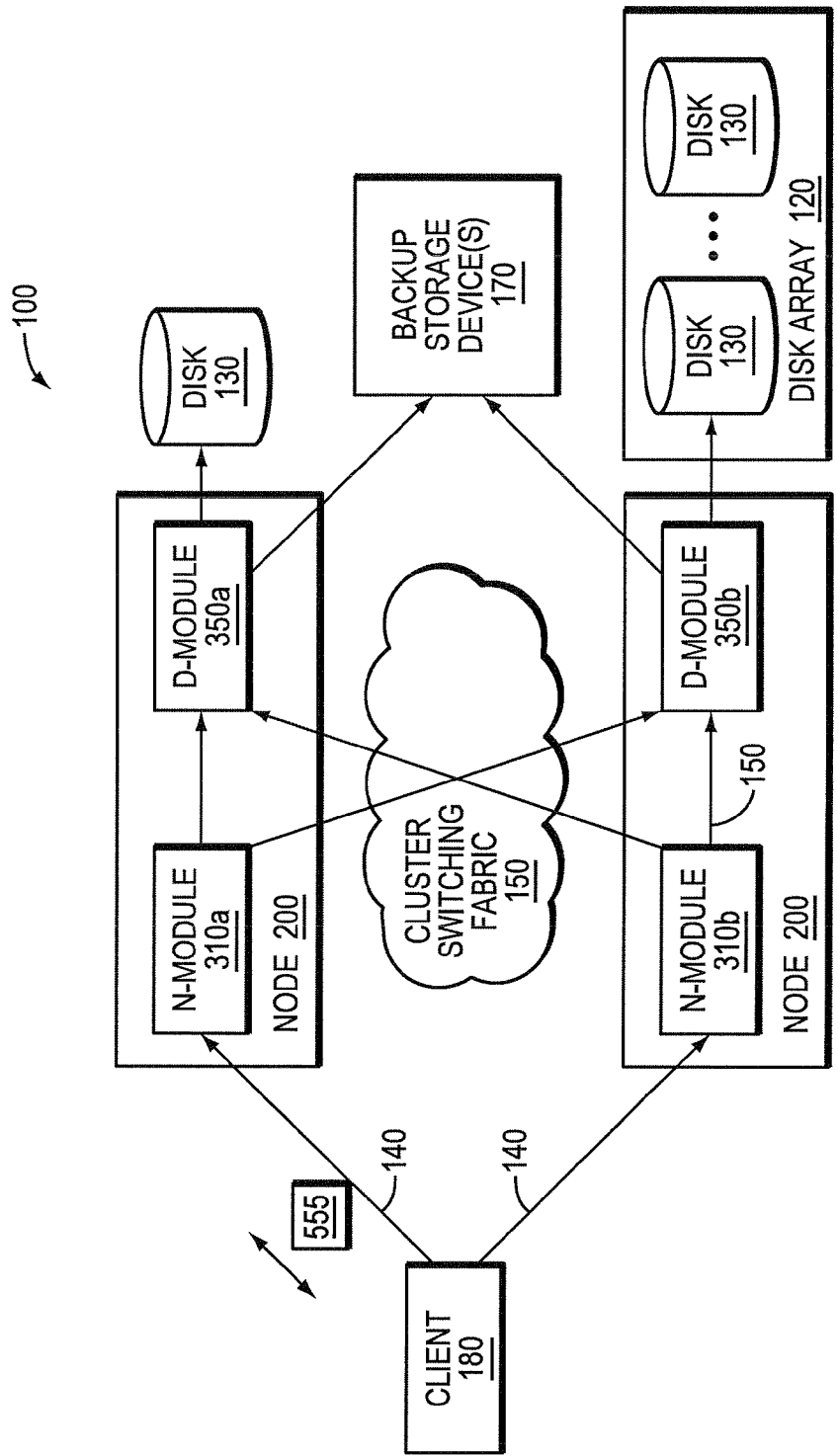
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310a/310b) and a disk element (D-module 350a/350b). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al. issued on Dec. 30, 2003. It should be is noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets (e.g., 555, described below) over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
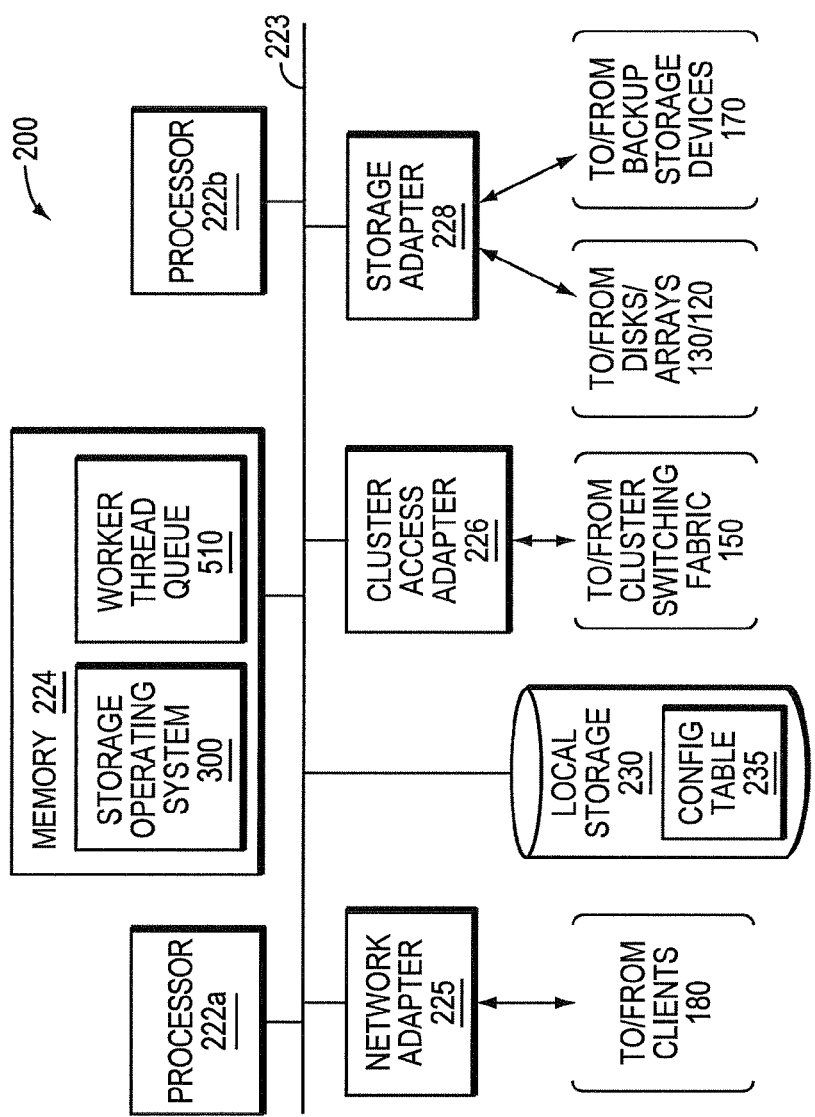
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228, and local storage 230 interconnected by a system bus 223. The local storage 230 comprises one or more storage devices, such as disks, utilized by the node to locally store configuration information (e.g., in configuration table 235) provided by one or more management processes. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files, and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention (e.g., worker thread queue 510, described below). The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more users/clients 180 over point-to-point links, wide area networks, virtual private networks implemented over a public network (Internet), or a shared local area network. The network adapter 225 thus may comprise the mechanical, electrical, and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data (555) according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology. Also, storage adapter 228 may also be illustratively coupled to one or more backup storage devices (e.g., tape devices) 170, as described herein and as will be understood by those skilled in the art.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System To facilitate access to the disks 130 (e.g., and backup storage device 170), the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
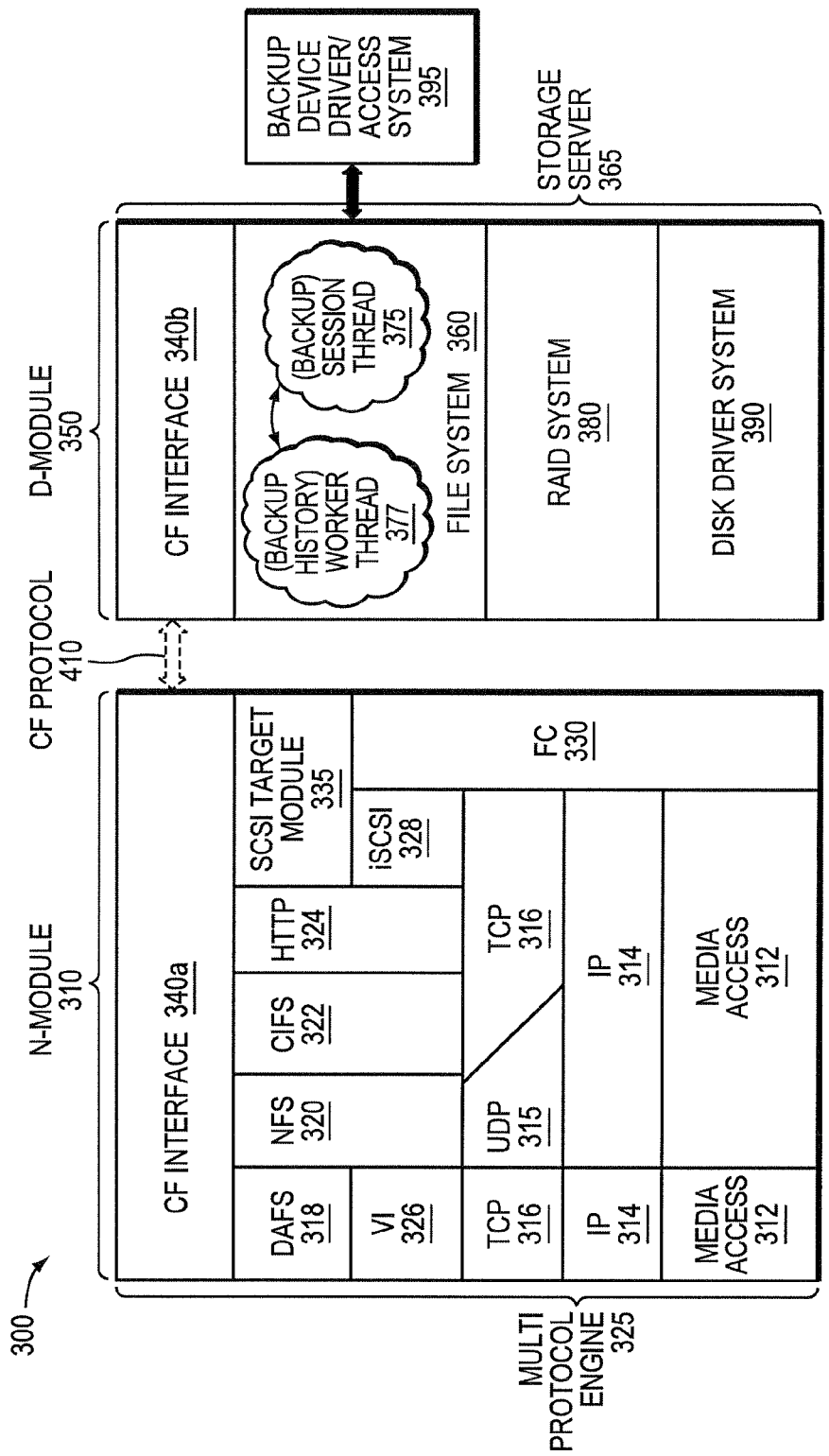
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multiprotocol engine includes a media access layer 312 of network drivers (e.g., gigabit Ethernet drivers) that interfaces to network protocol layers, such as the IP layer 314 and its supporting transport mechanisms, the TCP layer 316, and the User Datagram Protocol (UDP) layer 315. A file system protocol layer provides multi-protocol file access and, to that end, includes support for the Direct Access File System (DAFS) protocol 318, the NFS protocol 320, the CIFS protocol 322, and the Hypertext Transfer Protocol (HTTP) is protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while an FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360, a RAID system module 380, and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 also implements processes, such as a backup process (backup/session thread 375) and a backup history communication process (backup history/worker thread 377) in an exemplary embodiment of the present invention, as described herein. Further, the file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework, in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as files.

The file system 360 is illustratively a message-based system that provides logical volume management capabilities for use in access to the information stored on the stores age devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring, parity (RAID), and backup operations (e.g., in conjunction with backup device driver/access system 395, described below). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet (e.g., 555) over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Upon receiving the packet, the file system 360 generates operations to access the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures, and procedures described herein can be implemented in hardware, firmware, or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120 and to interface with one or more backup storage devices 170. In addition, the multi-protocol engine 325 is embodied as N-module 310 to (i) perform protocol termination with respect to a client issuing incoming packets 555 over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for, e.g., data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism.

The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP file system protocols available from Network Appliance, Inc. The SpinFS protocol is described in the above-referenced U.S. Pat. No. 6,671,773. To that end, the CF protocol is illustratively a multi-layered network protocol that integrates a session infrastructure and an application operation set into a session layer. The session layer manages the establishment and termination of sessions between modules in the cluster and is illustratively built upon a connection layer that defines a set of functionality or services provided by a connection-oriented protocol. The connection-oriented protocol may include a framing protocol layer over a network transport, such as TCP or other reliable connection protocols, or a memory-based IPC protocol. An example of a session layer that may be advantageously used with the present invention is described in commonly owned, copending U.S. patent application Ser. No. 11/118,466 entitled SYSTEM AND METHOD FOR MULTIPLEXING CHANNELS OVER MULTIPLE CONNECTIONS IN A STORAGE SYSTEM CLUSTER, filed by Peter F. Corbett et al. on Apr. 29, 2005, the contents of which are hereby incorporated in their entirety as though fully set forth herein The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
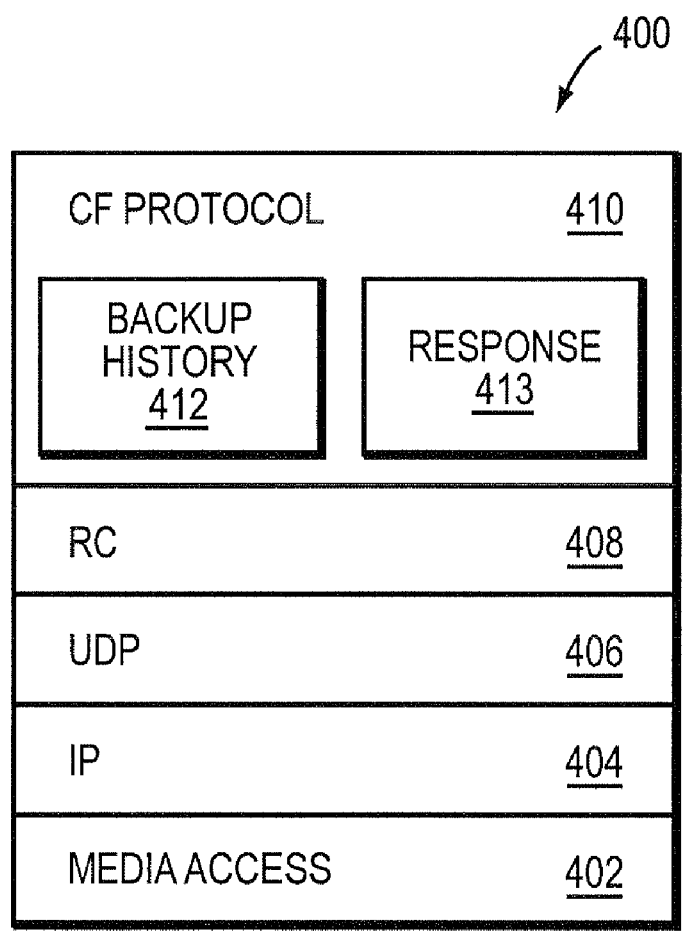
FIG. 4 is a schematic block diagram illustrating the format of a CF message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408, and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. To that end, in accordance with the present invention, CF protocol layer 410 may comprise one of either a backup history (e.g., aggregated) field 412 or a backup history response field 413 that may be used to transmit backup history communications as described herein. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

E. Backup Operation

In accordance with one or more embodiments of the present invention, one or more clients 180 may request that their stored data be backed up, e.g., copied from storage (e.g., disks 130) to a backup storage device 170, such as a tape device. According to an example backup operation, a backup thread 375 (in conjunction with the file system 360) accesses the client's data as stored on disks 130 (or disk arrays 120), and stores the client's data on the backup storage device 170. For instance, the backup thread 375 and file system 360 may communicate with a backup device driver/access system 395 to access either a locally managed backup storage device or a remotely managed backup storage device, accordingly. Illustratively, an example backup operation/technique that may be used in accordance with the present invention is described further in commonly-owned, copending U.S. patent application Ser. No. 10/796,249, entitled SYSTEM AND METHOD FOR INDEXING A BACKUP USING PERSISTENT CONSISTENCY POINT IMAGES, filed by Owara et al. on Mar. 9, 2004, the contents of which are hereby incorporated by reference in their entirety.

Also, an example protocol that may be employed for backup operations is an appropriate version (e.g., version 3 or 4) of the open source Network Data Management Protocol (NDMP). NDMP enables a standard set of functions and instructions to be transmitted between a source file system (360) and a backup device 170. In particular, NDMP messages may be communicated between a client 180 and the storage operating system 300 of a destination storage system (node) 200. By way of example, a description of NDMP Version 3 can be found in *NDMP-Network Data Management Protocol*, written by Network Working Group, R. Stager and D. Hitz, September 1997, the teachings of which are expressly incorporated herein by reference. Note, while an open source NDMP is used in an exemplary embodiment herein, it is expressly contemplated that other communication protocols may be employed.

In accordance with an illustrative backup operation, the client's data may be stored on the backup storage device 170 in association with a "backup index" that points to the location on the backup storage device or another image structure where the data (e.g., particular directories, files, etc.) resides. That is, the backup thread 375 generates backup history (or file history) of data/files that are backed up to the backup storage device as the data is backed up. For example, backup history may be generated for each predefined portion of the data (e.g., 4 kB blocks or individual files, etc.) that is backed up, generally indicating an identification of the data and possibly a location of the data on the storage device 170. The file history may then be transmitted to the client requesting the backup, which may use the backup history to create the backup index, e.g., a compilation of the backup history received from the storage system (backup thread 375). Upon receiving the backup history, the client may acknowledge receipt of the backup history to the backup thread, accordingly.

As noted, one problem associated with backup operations is that the backup thread typically waits for a response from the client that acknowledges the backup history prior to backing up a next set of data. Thus, the transmission of (and subsequent waiting for a response to) backup history is a significant performance bottleneck. In particular, as those skilled in the art may appreciate, backup history information may comprise large amounts (e.g., up to terabytes) of data, and as such, the transmission of the backup history may cause a substantial delay. In addition, multiple backup threads 375 may be present in the file system 360, each operating in parallel. As such, the multiple backup threads 375 may experience greater (e.g., combined) delays associated with transmitting backup history, such as due to greater amounts of history and locks that may be taken out by each of the backup threads (e.g., where each thread contends for resources of the storage system 200/operating system 300 during their respective backup operations).

F. Dedicated Backup History Communication Thread

The present invention overcomes the disadvantages of the prior art by providing a dedicated software thread for communicating backup history to clients of a storage system during backup operations. Illustratively, an operating system 300 of the storage system 200 comprises one or more "session" (e.g., backup) threads 375 and a "worker" (e.g., backup history) thread 377. In particular, the one or more session threads 375 are each configured to backup stored data for a corresponding client 180 to a backup storage device 170 (e.g., a tape device) and to generate backup history (e.g., file history) of data backed up to the backup storage device. Also, the worker thread 377 is configured to obtain the backup history from the one or more session threads 375, and transmit the backup history to the corresponding client of each of the one or more session threads. In this manner, the worker thread may wait for a response from the corresponding clients, while the one or more corresponding session threads continue to backup the stored data and generate backup history.

Figure 5:
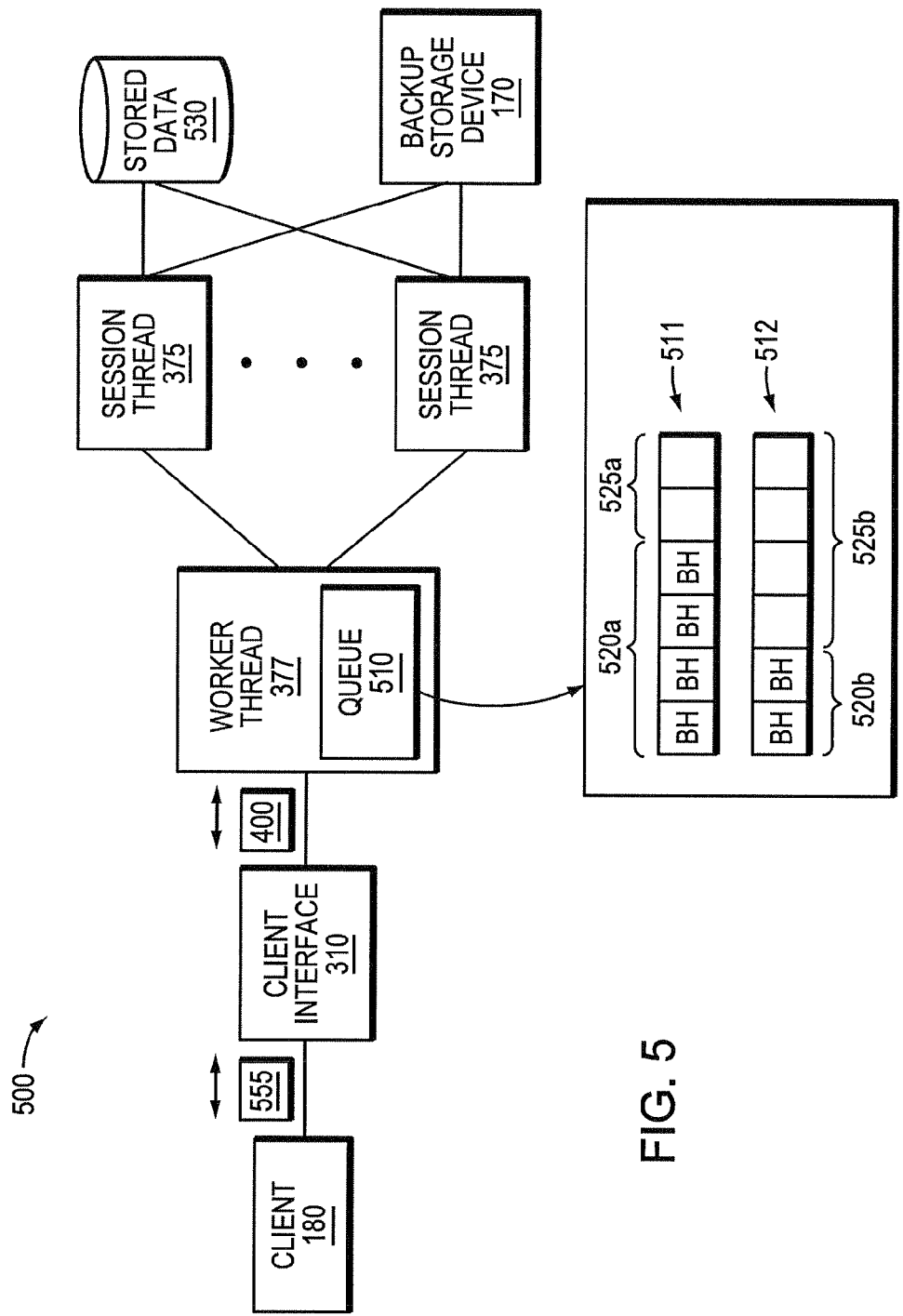
FIG. 5 is a schematic block diagram of an illustrative backup operation environment in accordance with one or more embodiments of the present invention.

Operationally, the session thread 375 backs up stored data for a requesting client 180 to a backup storage device 170, and generates backup history of the data backed up to the storage device, e.g., as described above. Rather than transmitting the backup history directly to the client 180, however, in accordance with the present invention, the session thread 375 transmits/sends the generated backup history to a worker thread 377 (e.g., a proxy thread), which is adapted to communicate the backup history with the client. For instance, FIG. 5 is a schematic block diagram of an illustrative backup operation environment 500 in accordance with one or more embodiments of the present invention. In particular, as just mentioned, the session thread(s) 375 may operate to transfer stored data 530 (e.g., from disks 130) to backup storage device 170, and may transmit the generated backup history to worker thread 377. That is, by deferring client communication responsibilities to the worker thread 377, session threads 375 may continue to backup the stored data and generate backup history without waiting for a response from the client. In this manner, the bottleneck associated with waiting for client response is substantially alleviated, allowing the session thread to continue backing up data unhindered. In particular, the worker thread 377 obtains the backup history from the session thread(s) 375 (e.g., in queue 510, described below), and transmits the backup history to the corresponding client of each of the session threads.

For example, assume that a first stream of data has been backed up to backup storage device 170 by the session thread 375. The backup history generated (e.g., a first history) may then be transmitted to the worker thread 377. Rather than wait for the first history to be communicated with the client, the session thread may continue to back up a second stream of data to the storage device 170 and generate a second history accordingly. In this manner, the session thread need not wait for acknowledgement from the client(s) in order to continue the backup operation, but may simply forward the history (e.g., the second history, and so on) to the worker thread, which maintains the responsibility of communicating with (and hence waiting for) the client(s).

Illustratively, the session thread(s) 375 and worker thread 377 are embodied within a D-module 350 of a storage system 200. As such, the worker thread may be configured to encapsulate the backup history into a backup history field 412 of a CF message 400, which may be transmitted to a corresponding client interface (N-module) 310. The client interface 310 may prepare the information for transmission across network 140 to the clients (e.g., packetizing the information), and may communicate the backup history with the client(s) 180 (e.g., in packets 555 with corresponding field 412).

Notably, in accordance with one or more embodiments of the present invention, the worker thread 377 may queue the obtained backup history from a plurality of session threads 375. For instance, multiple backup sessions may each correspond to a different backup operation, e.g., from a single client 180 or from a plurality of clients. Alternatively, a plurality of session threads 375 may be configured to operated in parallel for a single backup operation, such as for load-balancing and/or decreased backup operation times. The worker thread 377 obtains the backup history for all of the corresponding session threads 375, and may aggregate the backup history, thus sending aggregated backup history to the client(s) 180. For example, the worker thread 377 may transmit aggregated backup history for all session threads 375 to the client interface (N-module) 310, which may distribute the corresponding portions of the aggregated backup history to respective clients 180 for corresponding backup operations (sessions). Conversely, in accordance with one or more alternative embodiments, the worker thread 377 need not aggregate the backup history at all, or may aggregate backup history from each session thread 375 independently (i.e., sending backup history for a single session thread to the interface 310).

Once the worker thread 377 transmits the backup history to (toward) the client(s) 180, the worker thread waits for a response from the corresponding client(s), e.g., to acknowledge receipt of the backup history as described above. In particular, in accordance with the present invention, while the worker thread 377 waits for the response(s), the session thread(s) 375 continue to backup the stored data 530 and generate backup history, accordingly. In response to receiving a positive response from the client 180 (e.g., a packet/response 555 with backup history response field 413), the worker thread 377 may then transmit additional backup history obtained from the session thread(s) 375 (e.g., a corresponding session thread) to the client(s). Notably, the worker thread need not relay the positive response to the session threads, as the session threads are not waiting for such a response. Conversely, should the worker thread receive a negative response, which may be an explicit error message or no received response upon expiration of a response timer (e.g., indicating a loss of communication with the client 180 or otherwise), etc., the worker thread may inform/notify the corresponding session thread 375 of the negative response accordingly. As such, the corresponding session thread 375 receiving the notice may cease the backup of stored data for the corresponding client accordingly.

Illustratively, as mentioned above, the worker thread 377 may comprise one or more worker thread queues 510 (e.g., in memory 224) in accordance with the present invention, such as to store ("queue") the backup history from the one or more session threads 375 while the worker thread waits for responses from clients. For instance, the queue 510 may operate as a conventional first-in-first-out (FIFO) queue, as will be understood by those skilled in the art. In other words, as the session threads 375 transmit backup history to the queue 510 of the worker thread 377, the first backup history information (or first set of aggregated information) received is the first information sent to the client(s) 180. For example, as mentioned above, a first history and second history may be transmitted to the worker thread, and thus into queue 510. As such, if the first history is queued first, then the first history may be sent to the client(s) first.

As an alternative example, the queue 510 may comprise a collection of a "sendlist" 520 and a "freelist" 525. For example, the worker thread 377 may be configured to transmit a freelist to the one or more session threads 375 to indicate available space in the queue 510, and the session threads may transmit the backup history to the queue in response to the queue having available space (e.g., may "fill" slots of freelist). Notably, once a freelist slot is filled (e.g., "BH" in FIG. 5), then the corresponding slot belongs to the sendlist 520. The sendlist 520 represents the backup histories that may be sent to the client(s) 180, such as individually or in an aggregated manner, as described herein. While FIFO queues and freelists/sendlists may generally be understood by those skilled in the art, other conventional queuing techniques may also be used in accordance with the present invention, and those mentioned herein are merely representative examples.

In addition, in accordance with one or more embodiments of the present invention, the worker thread 377 may be further configured to maintain worker thread queues for each corresponding session thread 375 of a plurality of session threads. For example, a first queue 511 may correspond to a first session thread, while a second queue 512 may correspond to a second session thread. Accordingly, where each session thread has its own queue, the worker thread 377 may aggregate backup histories (e.g., sendlist slots) from all queues (e.g., 511 and 512), or may aggregate backup histories from each queue individually (that is, if configured to aggregate backup histories). In other words, backup history queuing at the worker thread 377 may be specifically localized to corresponding session threads 375, thus there is no sharing of resources by session threads. This avoids the need for the plurality of session threads to take locks on resources, thereby allowing the session threads to proceed in parallel.

Figure 6:
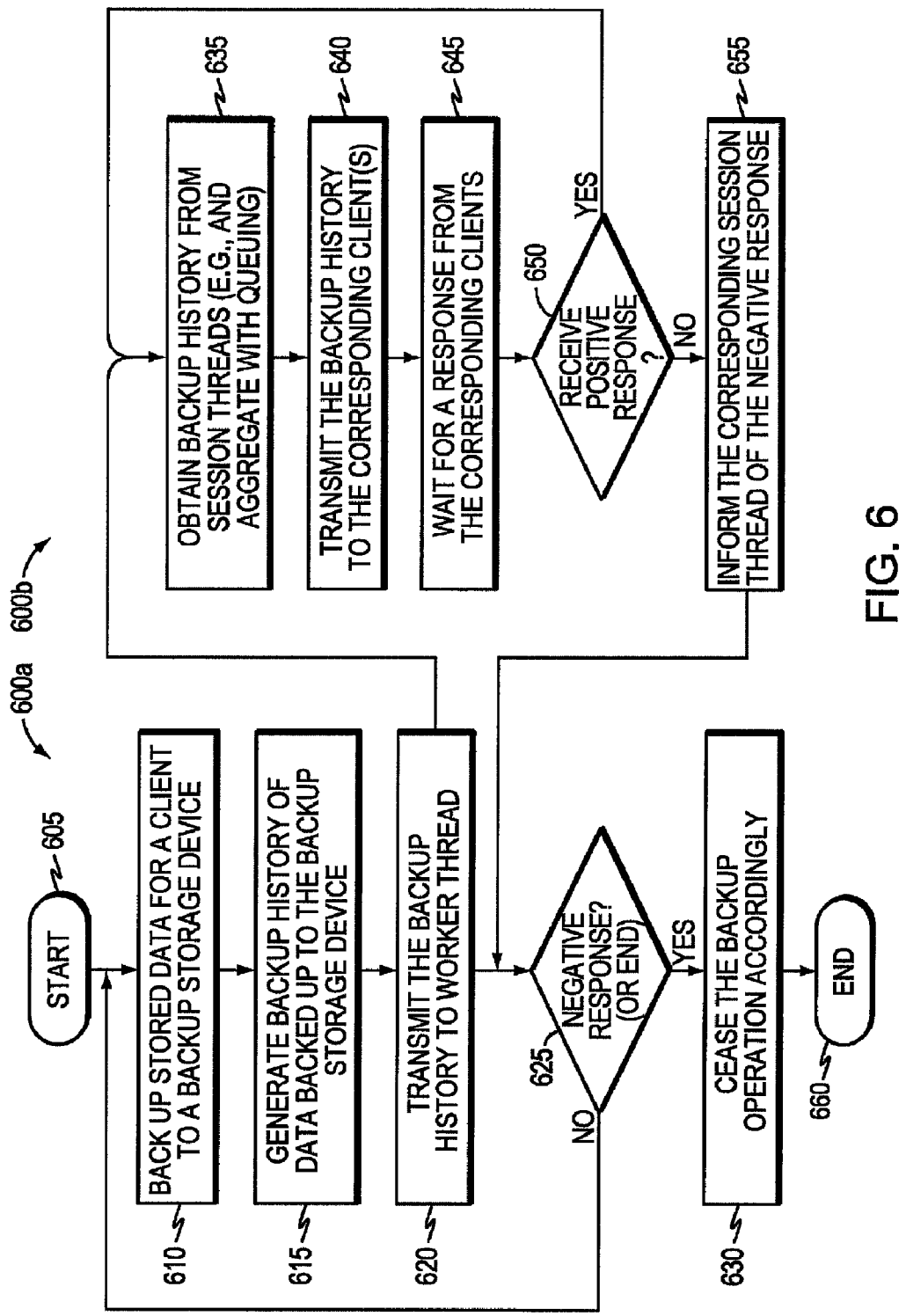
FIG. 6 is a flowchart detailing the steps of a procedure for providing a dedicated software thread for communicating backup history to clients of a storage system during backup operations in accordance with one or more embodiments of the present invention.

FIG. 6 is a flowchart detailing the steps of a procedure 600 for providing a dedicated software thread for communicating backup history to clients of a storage system during backup operations in accordance with one or more embodiments of the present invention. Notably, the procedure 600 may be divided into sub-procedures 600*a* for illustrative operation by the session thread, and 600*b* for illustrative operation by the worker thread. In particular, the procedure starts in step 605 and proceeds within sub-procedure 600*a* to step 610 where the session thread 375 of the storage system (node 200) backs up stored data 530 for a client 180, e.g., to backup storage device 170 as described above. Also, for each set of data backed up (e.g., each 4 kB portion, each file, etc.), the session thread 375 generates corresponding backup history in step 615, and transmits the backup history to a worker thread 377 in step 620. So long as there is no negative response in step 625, and so long as there is more data to backup, the sub-procedure 600*a* for the session thread 375 returns to step 610 to continue backing up additional data, i.e., without waiting for a (positive) response from the client 180. Once a negative response is received (that is, from step 655 below) or all the stored data 530 has been backed up, the session thread ceases the backup operation accordingly in step 630, and the procedure 600 ends in step 660.

Operating concurrently with the session thread sub-procedure 600*a* is a worker thread sub-procedure 600*b*, where in step 635 the worker thread 377 obtains backup history from one or more session threads, e.g., from step 620 above. Notably, as described above, the worker thread may aggregate the backup history, such as through various queuing techniques mentioned in more detail above (e.g., with queue 510). In step 640, the worker thread transmits (sends) the backup history to the corresponding client(s) 180, and waits for a response from the corresponding clients in step 645. (For example, in the illustrative embodiment, worker thread 377 of a D-module 350 transmits the backup history 412 in a CF message 400 to N-module 310, which forwards the backup history in packets 555 to the client(s) 180.) Once a positive response (e.g., packet 555 with positive response 413) is received at the worker thread (e.g., through the CF interface) at step 650, the worker thread (which has continued to obtain backup history in step 635) transmits another set of backup history to the clients in step 640. Notably, while not explicitly shown, the worker thread 377 may also update a freelist 525 of the queue 510 in response to the received positive response, as mentioned above. On the other hand, in response to a negative response (e.g., an actual negative response or a lack of response from the client 180) received in step 650, the worker thread 377 informs the corresponding session thread 375 of the negative response in step 655. As noted, the session thread in sub-process 600*a* receives the negative response at step 625, and the procedure 600 ends in step 660.

Advantageously, the novel technique provides a dedicated software thread for communicating backup history to clients of a storage system during backup operations. By configuring a worker thread to handle backup history communication with the clients, the novel technique allows the session threads to not have to wait for the client responses, and may thus continue to perform the backup of the stored data. In particular, the session threads are not blocked by the delays associated with client communication, thus improving efficiency of the backup operation. Also, by maintaining multiple session threads separately at the worker thread, the multiple session threads may operate in parallel, e.g., without requiring the acquisition and/or management of locks. In addition, the novel techniques do not require configuration on the clients 180 to operate in conjunction with the worker thread 377, and does not notice that (i.e., does not have to adjust for the fact that) any such optimizations are in place at the storage systems 200.

While there have been shown and described illustrative embodiments that provide a dedicated software thread for communicating backup history to clients of a storage system during backup operations, it is to be understood that various other adaptations and modifications may be made within the spirit and scope of the present invention. For example, the embodiments have been shown and described herein with/using particular threads logically located within particular systems/layers, etc. However, the embodiments of the invention in its broader sense are not so limited, and may, in fact, be used with any logical arrangement that may perform backup operations in a similarly applicable manner, i.e., with separate threads for backup operations and client (backup history) communications, as will be appreciated by those skilled in the art. Further, while the above description describes a backup storage device for use with storage of data for restoration purposes, other backup storage device purposes may advantageously utilize the teachings of the present invention, such as, e.g., mirroring applications, as will be appreciated by those skilled in the art.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules (network elements and disk elements), the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes, and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A storage system, comprising:
   one or more network interfaces configured to communicate with one or more clients;
   one or more processors coupled to the network interfaces and configured to execute one or more processes;
   one or more storage devices configured to contain stored data for the one or more clients; and
   a memory configured to store an operating system having threads executable by each processor, the operating system having
      one or more session threads configured to backup the stored data of a corresponding client to a backup storage device, and generate backup history of stored data backed up to the backup storage device, wherein the backup history is file history of the stored data backed up to the backup storage device, and
      a worker thread configured to obtain the backup history from the one or more session threads, transmit the backup history to the corresponding client of each of the one or more session threads, and wait for a response that acknowledges receipt of the backup history from the corresponding clients while the one or more corresponding session threads continue to backup the stored data and generate backup history without waiting for the response from the corresponding clients.

2. The storage system as in claim 1, wherein the worker thread is further configured to:
   receive a positive response from a corresponding client; and
   transmit additional backup history obtained from the corresponding session thread to the corresponding client.

3. The storage system as in claim 1, wherein the worker thread is further configured to:
   receive a negative response from a corresponding client; and
   inform the corresponding session thread of the negative response.

4. The storage system as in claim 3, wherein the negative response is an error message received from the corresponding client.

5. The storage system as in claim 3, wherein the negative response is no response received from the corresponding client by expiration of a response timer.

6. The storage system as in claim 3, wherein the one or more sessions threads are further configured to:
   receive notice of the negative response for a corresponding client from the worker thread; and in response,
   cease the backup of stored data for the corresponding client.

7. The storage system as in claim 1, wherein the worker thread is further configured to:
   aggregate backup history obtained from the one or more session threads; and
   transmit the aggregated backup history to the one or more clients.

8. The storage system as in claim 1, wherein the worker thread is further configured to:
   maintain a worker thread queue in the memory to queue the backup history from the one or more session threads while the worker thread waits for responses from clients.

9. The storage system as in claim 8, wherein the worker thread queue is a first-in-first-out (FIFO) queue.

10. The storage system as in claim 8, wherein the worker thread is further configured to:
maintain one or more worker thread queues in the memory each to correspondingly queue the backup history from each corresponding session thread while the worker thread waits for corresponding responses from corresponding clients.

11. The storage system as in claim 8, wherein the one or more session threads are further configured to:
transmit the backup history to the queue in response to the queue having available space.

12. The storage system as in claim 8, wherein the worker thread is further configured to:
transmit a freelist to the one or more session threads to indicate available space in the queue.

13. The storage system as in claim 1, wherein the backup history is a file history.

14. The storage system as in claim 1, wherein the backup storage device is a tape storage device.

15. The storage system as in claim 1, wherein the one or more session threads are further configured to:
transmit the backup history to the worker thread.

16. The storage system as in claim 1, wherein the one or more session threads are further configured to:
continue to backup the stored data and generate backup history without waiting for a response from a corresponding client.

17. A method, comprising:
backing up, by a session thread, stored data of a client to a backup storage device;
generating, by the session thread, backup history of the stored data backed up to the backup storage device, wherein the backup history is file history of the stored data backed up to the backup storage device;
transmitting the backup history to a worker thread, which is configured to communicate the backup history with the client; and
continuing to backup the stored data and generate backup history while the worker thread waits for a response from the client that acknowledges receipt of the backup history.

18. A method, comprising:
obtaining, by a worker thread, backup history from one or more session threads, the backup history generated by the session threads in response to backing up stored data of a corresponding client to a backup storage device, wherein the backup history is file history of the stored data backed up to the backup storage device;
transmitting the backup history to the corresponding client of each of the one or more session threads; and
waiting for a response from the corresponding clients that acknowledges receipt of the backup history, while the one or more corresponding session threads continue to backup the stored data and generate backup history without waiting for the response from the corresponding client.

19. The method as in claim 18, further comprising:
receiving a positive response from a corresponding client; and
transmitting additional backup history obtained from the corresponding session thread to the corresponding client.

20. The method as in claim 18 further comprising:
receiving a negative response from a corresponding client; and
informing the corresponding session thread of the negative response.

* * * * *

UNITED STATES PATENT AND TRADEMARK OFFICE
CERTIFICATE OF CORRECTION

PATENT NO. : 7,797,284 B1
APPLICATION NO. : 11/844442
DATED : September 14, 2010
INVENTOR(S) : Sridhar Chellappa et al.

It is certified that error appears in the above-identified patent and that said Letters Patent is hereby corrected as shown below:

Col. 1, Line 61, please replace "block is is thereafter" with "block is thereafter"

Col. 2, Line 38, please replace "to is the client" with "to the client"

Col. 4, Line 36, please replace "should be is noted" with "should be noted"

Col. 6, Line 66, please replace "(HTTP) is" with "(HTTP)"

Col. 7, Line 40, please replace "stores age" with "storage"

Col. 16, Line 15, please replace "history of stored" with "history of the stored"

Signed and Sealed this

Seventh Day of December, 2010

David J. Kappos
*Director of the United States Patent and Trademark Office*